United States Patent Office 3,706,772
Patented Dec. 19, 1972

3,706,772
FLUORODIGLYCIDYL ETHERS
Scott A. Reines, Fort Lee, N.J., assignor to the United
States of America as represented by the Secretary of
the Navy
No Drawing. Filed Mar. 23, 1971, Ser. No. 127,379
Int. Cl. C07d 1/18
U.S. Cl. 260—348 R     3 Claims

ABSTRACT OF THE DISCLOSURE

Compounds of the formulae

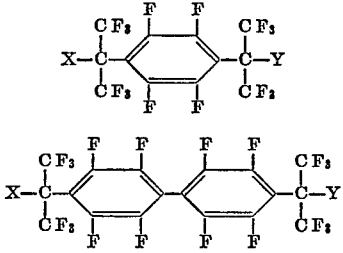

wherein X and Y are OH or

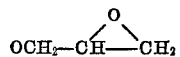

useful for producing polymers with film forming properties.

STATEMENT OF GOVERNMENT INTEREST

The invention described herein may be manufactured and used by or for the Government of the United States of America for governmental purposes without the payment of any royalties thereon or therefor.

SUMMARY OF THE INVENTION

This invention relates to fluorinated diglycidyl ethers. More specifically, it relates to bis (2-hydroxyhexafluoro-2-propyl)-tetrafluorobenzene and -octafluorobiphenyl intermediates and their corresponding diglycidyl ethers.

BACKGROUND OF THE INVENTION

Compounds suitable for producing epoxides of varying properties from those of the prior art are in great need. Although epoxy compounds have great strength especially when combined with fabrics, such compounds generally are hydrophilic in nature. After prolonged contact with water they tend to propagate cracks within their structures and generally have lower strength factors than before contact with water. Compounds are needed for producing polymers of high strength that will withstand the effects of submergence in water. Recent publications (cf. Journal of Organic Chemistry 35, 2772 (1970)), describe polymerizable compounds suitable for producing polymers having improved resistance to water. However these compounds are still not completely immune from loss of strength through contact with water.

THE INVENTION

I have discovered a new class of intermediates and their corresponding diglycidyl ethers suitable for use in synthesizing polymers having increased resistance to water. The compounds have the following structural formulae:

(1)

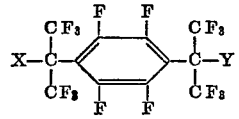

(2)

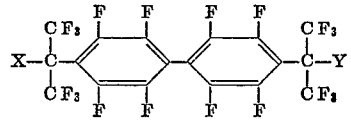

wherein

X is OH or

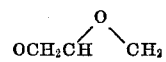

and

Y is OH or

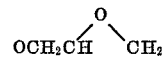

with the proviso that X and Y must have the same meaning in each of the structures.

The hydroxy compounds described are 1,4-bis(2-hydroxyhexafluoro-2-propyl) tetrafluorobenzene and 4,4'-bis(2-hydroxyhexafluoro-2-propyl) octafluorobiphenyl.

Such hydroxy intermediates, prepared by the procedurues described hereinafter, are used to produce the corresponding diglycidyl ethers. These ethers, suitable for polymerization into film forming polymers, are also included in the above structural formulae. These polymer films, prepared from polymerizing the diglycidyl ethers by conventional techniques, have high tensile strength especially when combined with fabric and are less hydrophilic than related prior art compounds.

The intermediate hydroxy compound of Formula 1 above is prepared by first reacting tetrafluorobenzene dissolved in tetrahydrofuran and kept at low temperatures with butyl lithium followed by condensation of the lithiated intermediates with hexafluoroacetone and hydrolysis of the condensation products. This reaction is described by the following equation:

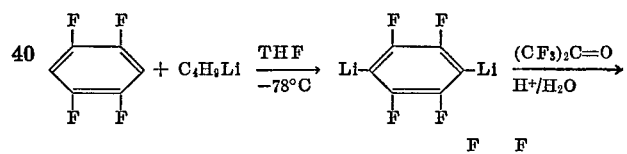

The hydroxy biphenyl compound of Formula 2 above is prepared by reacting dibromooctafluorobiphenyl with butyl lithium followed by condensation of the lithiated intermediate with hexafluoroacetone and hydrolysis of the condensation product. This reaction is described by the following equation.

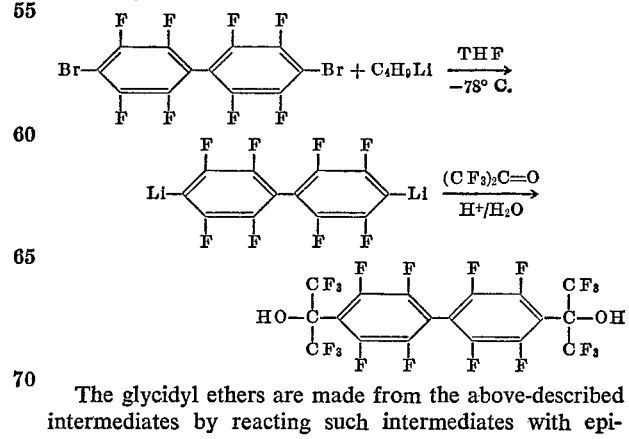

The glycidyl ethers are made from the above-described intermediates by reacting such intermediates with epichlorohydrin and a strong base such as sodium hydroxide. The reactions to form the glycidyl ethers are described by the following equations.

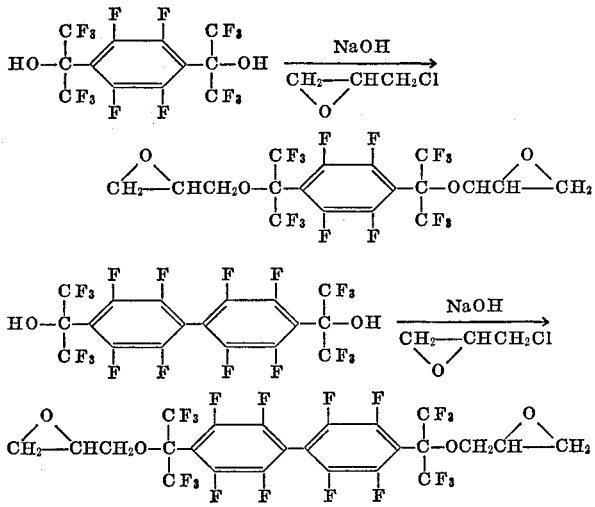

The glycidyl ether can be purified by repeated recrystallization with methanol.

The purified glycidyl ether can be homopolymerized or copolymerized with another monomer by conventional techniques using a catalyst such as a tertiary amine. The polymers produced have high tensile strengths and moderate hydrophobicity.

The following additional examples are provided to set forth the invention in still greater detail. All percents are by weight unless specifically stated otherwise.

Example I

Twenty-five grams of 1,2,4,5-tetrafluorobenzene (⅙ mole) is dissolved in 325 milliliters of terahydrofuran. This solution is cooled to −78° C. and there is added to it 46.2 grams of a 23.1% solution of butyl lithium in hexane. A white suspension forms and is stirred for 30 minutes. Excess hexafluoroacetone is then condensed into a Dry Ice trap and distilled into a reaction vessel. The reaction vessel is a 500 milliliter three necked flask equipped with an alcohol thermometer. The hexafluoroacetone reaction is carried out in a nitrogen atmosphere. The white suspension then clears and is allowed to stand overnight. The next day the solution is stirred and hydrolyzed with 2 N hydrochloric acid. The two layers forming are separated in a separatory funnel. The aqueous layer is extracted with ethyl ether and the extract is combined with the organic layer which is then washed twice with water and twice with saturated sodium chloride solution. The product is dried over anhydrous sodium sulfate. Thereafter the volatile organic phase is distilled off leaving a residue. The residue consists of two materials. One material as determined by gas chromatography is 80% by weight and the other 20% by weight. The larger material is recrystallized with carbon tetrachloride to yield 18 grams of a white crystalline material melting at 99–101° C. By infrared and NMR techniques this product is identified as 1,4-bis(2-hydroxyhexafluoro-2-propyl) tetrafluorobenzene.

Example II

Twelve grams (0.026 mole) of 4,4′-dibromooctafluorobiphenyl is added to 700 milliliters of anhydrous ethyl ether in a nitrogen atmosphere in a 1000 milliliter flask of the same type described in Example I above. Thereafter 35 milliliters of a 23.1% solution of butyl lithium in hexane (.09 mole) is added to the solution causing the formation of a white suspension. This suspension is stirred for two and one-half hours at −75° C. Then 20 milliliters of hexafluoroacetone (28 grams or 0.17 mole) is distilled into the flask above the solution. After one hour of stirring the solution is allowed to warm to 0° C. and 200 milliliters of 2 N hydrochloric acid is added. The resulting two-phase mixture is transferred to a separatory funnel and the layers separated. The aqueous layer is extracted twice with ethyl ether. The two ether solutions are combined, washed with water and extracted with 4 N sodium hydroxide solution. This gives a third phase insoluble in sodium hydroxide or ethyl ether. This third phase is separated and found to be water soluble. Upon acidification of the aqueous solution of the third phase, a white precipitate is formed. It is extracted into ethyl ether. Evaporation of this ethyl ether solution yields 9 grams of a white solid melting at 185–195° C.

The original aqueous phase is then acidified to form a white precipitate which is extracted with ethyl ether. Evaporation of this solution gives 1.5 grams of a white solid. The combined solids indicate a 63% yield of 4,4′-bis(2-hydroxyhexafluoro-2-propyl) octafluorobiphenyl. One and one-half grams of this product is recrystallized from chloroform to give a pure white crystalline solid, melting point at 196–198° C. This is a pure form of the 4,4′-bis(2-hydroxyhexafluoro-2-propyl) octafluorobiphenyl as determined by infrared and NMR techniques.

Example III

The 1,4-bis(2-hydroxyhexafluoro-2-propyl) tetrafluorobenzene of Example I is reacted with epichlorohydrin and sodium hydroxide in the manner set forth by Kelly, P. B., Landua, A. J., and Marshall, C. D., J. Appl. Polymer Sci., VI, No. 22, 425 (1962). The resulting product as determined by NMR and infrared analysis is the diglycidyl ether of 1,4-bis(2-hydroxyhexafluoro-2-propyl) tetrafluorobenzene. It is recrystallized in methanol to form a solid crystalline product having a melting point of 149–151° C. Analytical $C_{18}H_{10}F_4$ (percent) carbon calculated 36.38, found 35.82; hydrogen calculated, 1.70, found, 1.77; fluorine calculated, 51.15, found 52.01.

Example IV

Five- and six-tenths grams of 4,4′-bis(2-hydroxyhexafluoro-2-propyl) octafluorobiphenyl (0.0089 mole) from the product of Example II is reacted with 8.3 grams of epichlorohydrin, 8.3 grams of acetone and 1.2 grams of water. The mixture is heated to reflux while stirring magnetically in a 50 milliliter, single-necked, round-bottom, "Bantamware" glass flask. Thereafter 0.1784 gram of sodium hydroxide and 4.0 milliliters of water are added according to the procedures of Kelly, Landua, and Marshall, set forth in Example III above. The solution is then cooled and evaporated on a rotary evaporator until solvents are almost gone. The residue is dissolved in ethyl ether, washed with water, sodium bicarbonate solution and saturated sodium chloride solution. The material is then dried overnight over anhydrous sodium sulfate. The ethyl ether is evaporated and the residue is recrystallized from methanol. This leaves a gummy solid. A second recrystallization is carried out again using methanol. It gives a crystalline material melting at 104–112° C. A third crystallization is carried out using methanol and this produces a white crystalline product melting at 132–134° C. A fourth recrystallization using methanol is carried out and it produces two grams of a white crystalline material having a melting point of 138–141° C. The yield of this product is 30%. The analytical data is as follows: $C_{24}H_{10}F_{20}O_4$ (percent) carbon calculated 38.83, found, 38.73; hydrogen calculated, 1.36, found, 1.34; fluorine calculated, 51.19, found, 51.00.

The glycidyl ethers of Examples III and IV, in addition to the utilities set forth above, are also useful as precursors for fluoropolyols which in turn can be made into fluoropolyurethanes, useful for aircraft coatings. Additionally, the same glycidyl ethers can be used as a matrix adhesive for filament-wound composites. Thirdly, these glycidyl ethers can be used as an adhesive for laser windows.

What is claimed and desired to be secured by Letters Patent of the United States is:

1. A compound of the formula

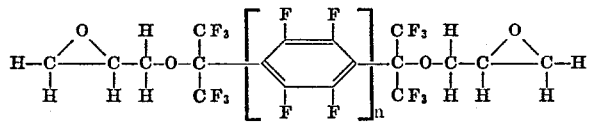

wherein $n$ is an integer from 1 to 2.

2. A compound according to claim 1 which is the diglycidyl ether of 1,4-bis(2-hydroxyhexafluoro-2-propyl) tetrafluorobenzene.

3. A compound according to claim 1 which is the diglycidyl ether of 4,4'-bis(2-hydroxyhexafluoro-2-propyl) octafluorobiphenyl.

References Cited

S. A. Reines et al., Jour. Org. Chem., vol. 35, No. 8, 1970, pp. 2772–2.

S. A. Reines et al., Jour. Org. Chem., vol. 36, No. 9, 1971, pp. 1209–13.

NORMA S. MILESTONE, Primary Examiner

U.S. Cl. X.R.

260—2 EP, 618 D, 649 F, 650 F